March 27, 1945.  H. A. TORBETT  2,372,533
STEAM AND WATER MIXER
Filed June 9, 1943   3 Sheets-Sheet 1

INVENTOR.
H. A. Torbett
BY
C. A. Snowles.
ATTORNEY

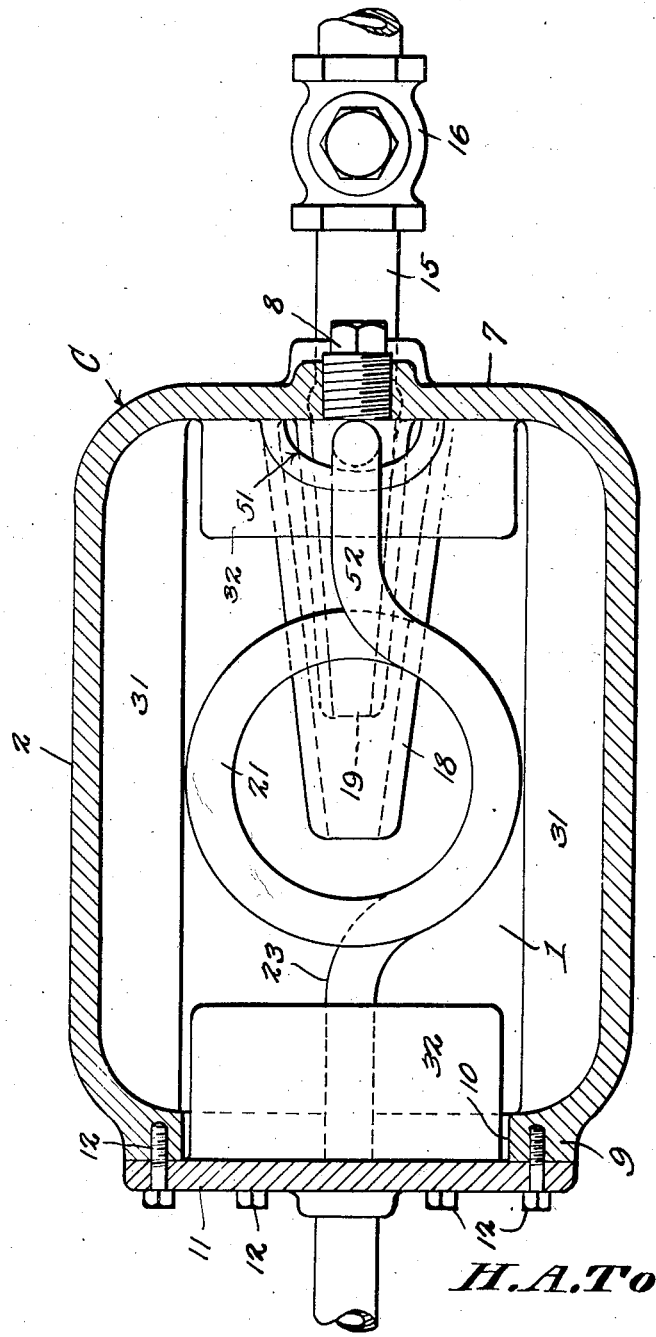

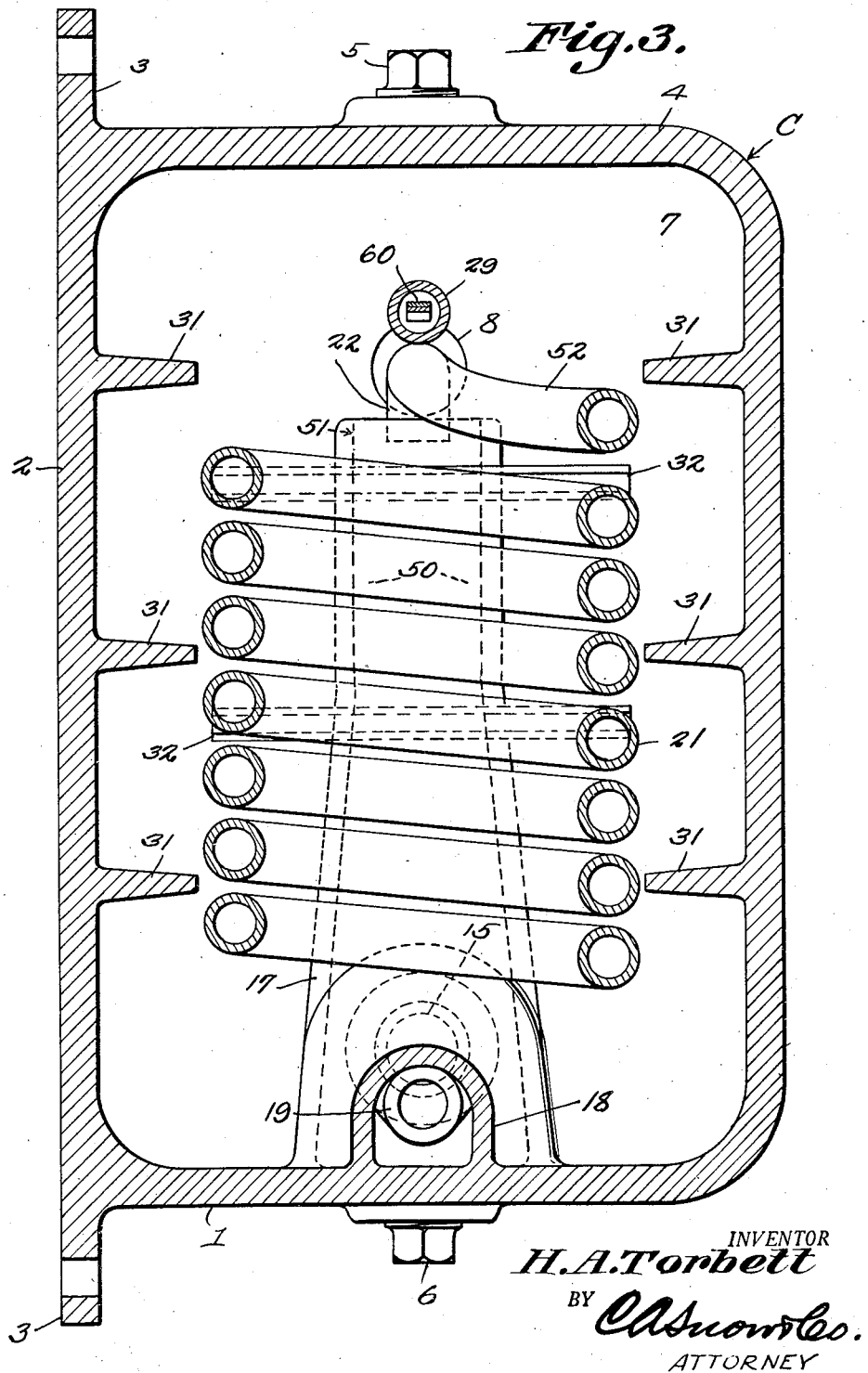

Patented Mar. 27, 1945

2,372,533

UNITED STATES PATENT OFFICE 2,372,533

STEAM AND WATER MIXER

Horace A. Torbett, Knoxville, Tenn.

Application June 9, 1943, Serial No. 490,214

2 Claims. (Cl. 261—10)

The object of this invention is to provide a simple means for heating water, by mingling steam with the water. The invention, aims, also, to provide novel means for heating the water through the walls of a conducting coil, traversed by the steam.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a horizontal section on the line 2—2 of Fig. 1;

Fig. 3 is a transverse section on the line 3—3 of Fig. 1.

Figure 1:
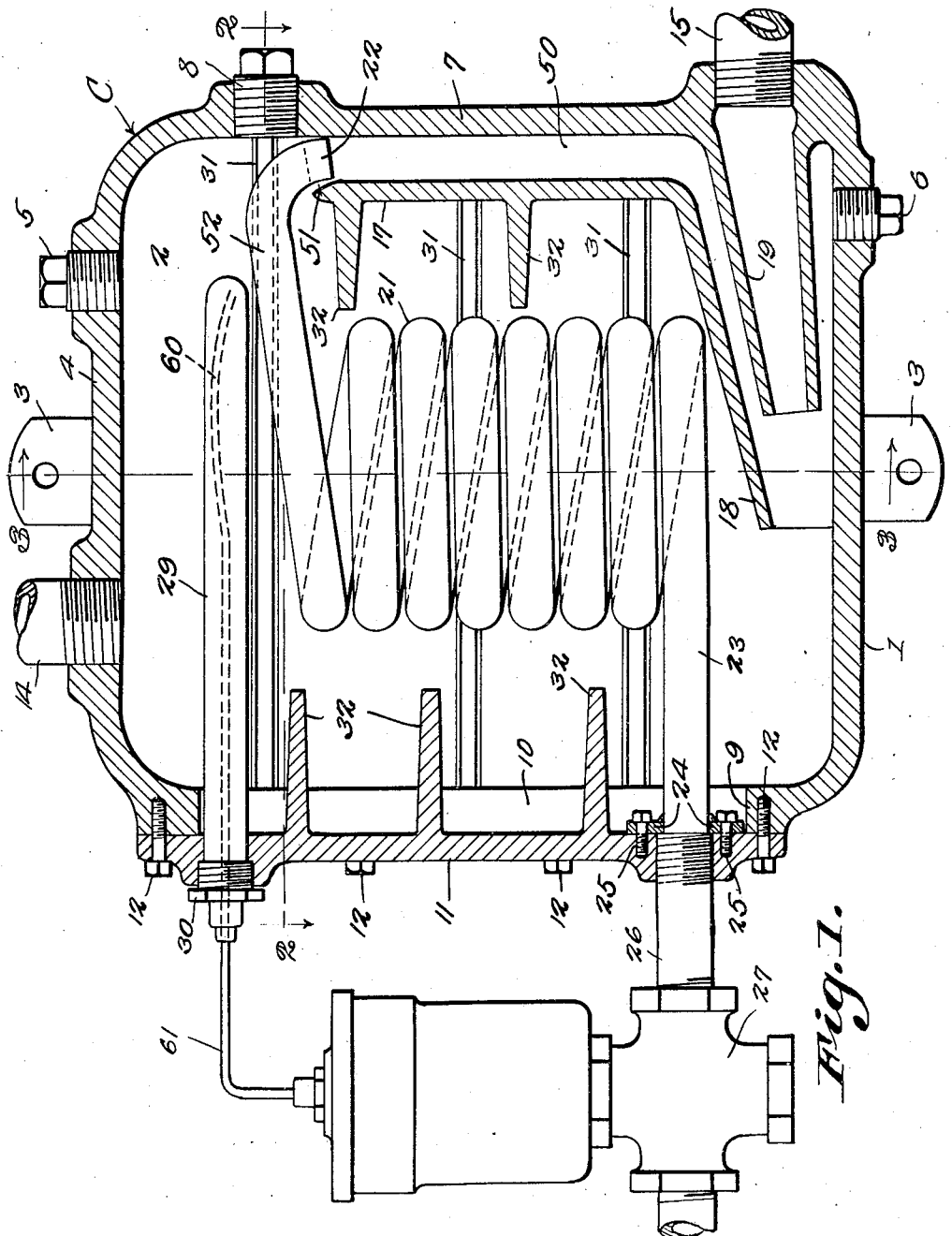
Fig. 1 shows in vertical, longitudinal section, a heater constructed in accordance with the invention.

In carrying out the invention, there is provided an approximately rectangular casing C, preferably made of metal. The casing C includes a bottom 1, carrying a removable plug 6, a rear wall 2, having attaching lugs 3, and a top 4 having a removable plug 5 and an outlet 14 for heated water.

The casing C comprises a first end wall 7, provided with a removable plug 8 and with a cold water inlet 15, in which is interposed a valve 16 under the control of an operator.

The second end wall of the casing C is marked by the numeral 9 and has a large opening 10. A closure plate 11 spans the opening 10 and is held in place by securing elements 12.

A vertical, inwardly extended tubular conductor 17 is formed integrally with the wall 7 and extends downwardly to a substantially horizontal, inverted trough-shaped, inwardly tapered hot water nozzle 18, formed integrally with the bottom 1. The conductor has a passage 50, communicating with the nozzle 18. A cool water nozzle 19 is formed integrally with the wall 7 and is disposed in a substantially horizontal position, the nozzle 19 having communication with the water inlet 15. The nozzles 19 and 18 discharge in the same direction. The cool water nozzle 19 extends into the steam nozzle 18, but is spaced transversely therefrom, and from the bottom 1 of the casing C.

The conductor 17 is provided with an opening 51 at its upper end and forming a water inlet for the passage 50. Disposed centrally in the casing C is a steam-conducting, heat-interchange means, such as a coil 21, through which steam passes. The coil 21 is arranged concentrically with respect to the casing C and has an upper, lateral arm 52, provided with a depending end 22, extended downwardly into the opening 51 at the upper end of the passage 50. The cross sectional area of the end 22 of the arm 52 is considerably less than that of the opening 51, so that the opening is in communication with the interior of the casing C.

At its lower end, the coil 21 has a laterally extended arm 23, to which is secured a collar, held on the inner surface of the plate 11, by securing elements 25. The numeral 26 designates a steam pipe, which abuts against the collar 24 and is threaded into the closure plate 11 and is in communication with the arm 23 of the coil 21. A thermostatic valve mechanism 27 is interposed in the steam pipe 26. A bulb 29 is prolonged through the opening 10 of the wall 9, the bulb extending across the upper end of the coil 21. A threaded gland 30 or the like may be employed to hold the bulb 29 in the closure plate 11. The bulb 29 encloses thermostatic element 60, joined by a transmission tube 61 to the thermostatic valve mechanism 27.

The rear wall 2 and the front wall 9 carry inwardly projecting, substantially horizontal fins 31, the fins on the front wall being disposed in alignment with the fins on the rear wall. The closure plate 11 and the wall 7 carry inwardly projecting fins 32, the fins on the end wall being disposed out of alignment with the fins on the closure plate, and all of the fins on the end wall and on the closure plate being disposed out of alignment with the fins 31 on the rear wall 2 and the front wall 9. This specific arrangement of the fins promotes a thorough circulation of water about the heating unit or coil 21.

In practical operation, the steam, under the control of the thermostatic valve 27, moves through the pipe 26 and enters the coil 21 by way of the arm 23. The water of condensation or steam passes through the down-turned end 22 of the upper arm 52 of the coil 21 and the steam is condensed, drawing warm water from the casing C through the opening 51 at the upper end of the passage 50. The heated water moves downwardly through the passage 50, into and out of the nozzle 18. The cold water is drawn through the connection 15 and the nozzle 19 and the water mixture rises about the coil 21, the heated water discharging through the outlet 14.

The device is simple in construction and effects a saving of metal, in that many parts, such as the nozzles 18 and 19, the conductor 17, and the fins 32, are integrally formed.

It may be noted that when the closure 11 is taken off, practically all working parts of the device come out with it.

The plug 5 is a general purpose, top-clean-out plug, and floating dirt can be flushed away if said plug is removed. The plug 8 enables the operator to pry up the end 22 of the coil 21 a little, if such an operation is necessary when the coil is removed or replaced along with the plate 11. The plug 6 is a bottom drain plug.

The water receives a double heating: once as it enters the passage 50 along with the water of condensation, or steam, from the end 22 of the coil 21, and again as it rises about the coil.

What is claimed is:

1. In a water heater, a casing including a top, and provided in its upper portion with an outlet for heated water, and near its bottom with an inlet for cool water, an inverted, trough-shaped, transverse nozzle for partially heated water and formed integrally with one wall of the casing and with the bottom thereof, a substantially vertical inwardly extended, upright conductor, the upper end of which is spaced from the top of the casing, the conductor being formed integrally with said wall and with the specified nozzle, and having its lower end in communication with the specified nozzle, the conductor being open near its upper end, a cool water nozzle within the specified nozzle and formed integrally with said wall of the casing, the cool water nozzle being in communication with the inlet, and being spaced transversely from the bottom of the casing and from bore-wall of the specified nozzle, a stream coil in the casing and located above the inner end of the specified nozzle, and means for supplying steam to the lower end of the coil, the upper convolution of the coil terminating in a depending end member extended downwardly into the conductor and terminating so close to the upper end of the conductor as to minimize choking of the conductor, the cross-sectional area of the end member being less than the cross-sectional area of the bore of the conductor, to permit water to flow from the casing into the upper end of the conductor.

2. In a water heater, a casing including a top, and provided in its upper portion with an outlet for heated water, and near its bottom with an inlet for cool water, a substantially horizontal nozzle for partially heated water located at the bottom of the casing, a substantially vertical conductor at one side of the casing and in communication at its lower end with the specified nozzle, the upper end of the conductor being open and spaced from the top of the casing, a cool water nozzle within the specified nozzle and in communication with the inlet, a steam coil in the casing and located above the inner end of the specified nozzle, and means for supplying steam to the lower end of the coil, the upper convolution of the coil terminating in a depending end member extended downwardly into the conductor and terminating so close to the upper end of the conductor as to minimize choking of the conductor, the cross-sectional area of the end member being less than the cross-sectional area of the bore of the conductor, to permit water to flow from the casing into the upper end of the conductor.

HORACE A. TORBETT.